US008239760B2

(12) United States Patent
Hanson et al.

(10) Patent No.: US 8,239,760 B2
(45) Date of Patent: Aug. 7, 2012

(54) MULTI-USER DOCUMENT EDITING SYSTEM AND METHOD

(75) Inventors: Mark Hanson, Los Angeles, CA (US); David Brookler, Los Angeles, CA (US); Alex Emelianov, Tarzana, CA (US)

(73) Assignee: SAP AG, Walldorf (DE)

( * ) Notice: Subject to any disclaimer, the term of this patent is extended or adjusted under 35 U.S.C. 154(b) by 822 days.

(21) Appl. No.: 11/768,695

(22) Filed: Jun. 26, 2007

(65) Prior Publication Data

US 2009/0006946 A1 Jan. 1, 2009

(51) Int. Cl.
*G06N 3/00* (2006.01)
(52) U.S. Cl. .................................................. 715/255
(58) Field of Classification Search .................. 715/234, 715/243, 254, 751, 255
See application file for complete search history.

(56) References Cited

U.S. PATENT DOCUMENTS

| | | | | |
|---|---|---|---|---|
| 5,623,659 | A * | 4/1997 | Shi et al. | 1/1 |
| 5,845,299 | A * | 12/1998 | Arora et al. | 715/209 |
| 6,898,642 | B2 * | 5/2005 | Chafle et al. | 709/248 |
| 2002/0065848 | A1 * | 5/2002 | Walker et al. | 707/511 |
| 2006/0080432 | A1 * | 4/2006 | Spataro et al. | 709/224 |
| 2006/0117247 | A1 * | 6/2006 | Fite et al. | 715/511 |
| 2007/0186157 | A1 * | 8/2007 | Walker et al. | 715/530 |
| 2009/0125478 | A1 * | 5/2009 | Layden et al. | 707/2 |
| 2009/0254830 | A9 * | 10/2009 | Reid et al. | 715/731 |

OTHER PUBLICATIONS

Weinmann et al., "QuarkXPress 5 for Macintosh and Windows: Visual QuickStart Guide," Apr. 17, 2002, Peachpit Press, pp. 315-316.*
Penston, George, "Adobe Creative Suite 2 How-Tos: 100 Essential Techniques," Dec. 8, 2005, Adobe Press, pp. 61-62.*

* cited by examiner

*Primary Examiner* — Kyle Stork
(74) *Attorney, Agent, or Firm* — Buckley, Maschoff & Talwalkar LLC

(57) ABSTRACT

A multi-user document editing system and method. Embodiments of the invention utilize a model-view-controller design pattern to successfully control changes in parallel to underlying backend database information presentation related information. Granularity of protection and check in/check out on family, spread, presentation layer and presentation object. In addition, enables automatic update of changes to all users editing or viewing the information. Changes to the backend database may also include changes to the family hierarchy with real-time update of publication WYSIWYG pages for example. Enables rollback of changes. Instead of waiting constantly for other users to finish editing information before other edits can be made, the typical serial editing methodology is transformed by embodiments of the invention into a parallel methodology that greatly increases throughput and lowers the costs associated with large publications.

16 Claims, 21 Drawing Sheets

MULTI-USER DOCUMENT EDITING SYSTEM AND METHOD

BACKGROUND OF THE INVENTION

1. Field of the Invention

Embodiments of the invention described herein pertain to the field of computer systems. More particularly, but not by way of limitation, one or more embodiments of the invention enable a multi-user document editing system and method enabling multiple users to simultaneously edit a document associated with a database.

2. Description of the Related Art

Current document sharing systems lack an effective mechanism for enabling multiple users to simultaneously edit a given document associated with a database and observe and control with a fine level of granularity modifications occurring on the document. Instead document-sharing systems that provide layout manipulation on more than one system generally allow one user at a time to edit a given document. Examples of such products include desktop publishing and word processing programs. If one person is already using a document that is available on a shared resource other users that wish to also edit the document must wait for one another to finish editing before access to the document is permitted. Some document sharing systems rely on an underlying database to lock the document, however database systems that lock data on a record-by-record basis generally enabled serial editing but do not permit users to work efficiently in parallel.

Current systems may provide a read only view for example of data and/or deny an update when another user has locked a record. Since the underlying architecture of existing document sharing systems is document oriented and tied to the architecture of the database, these systems fundamentally fail to provide multi-user simultaneous editing. In addition, since many document sharing systems utilize presentation data that is intermixed with the data content itself, large numbers of records must be updated when changing simple formatting. When the number of users waiting to edit a document or portion thereof becomes high enough, the cost associated with producing a large enough document using this inefficient serial editing process makes publication too resource intensive for many organizations.

By breaking a document into various sub-documents, the problem can broken into a smaller set of problems. However, if one user decides to change the layout of a sub-document and the other users editing the other sub-documents do not, then the overall look and feel of the document becomes disjointed and inconsistent. An inconsistent look and feel of a document is generally not desired. For example, a product catalog that has some sections in one font and another set of sections in another font is generally not desired. Maintaining the overall consistency of a document becomes unwieldly when the number of sub-documents grows. Therefore, although the problem is seemingly solved by breaking a document into smaller pieces, other problems related to consistency and maintenance arise.

Typical desktop publishing programs such as QUARKXPRESS® do not permit multiple users to simultaneous edit the presentation and content data. Whiteboard programs and instant messaging programs exist that allow multiple users to input data simultaneously to a common area that is generally delimited on a line by line or color basis per user. However, these programs are not associated with persistent data and the data that is altered by each user is generally edited locally before being added to the multi-user area of the associated program. Such programs are not capable of handling enterprise level publication data that requires robust persistence in a production environment and involves complex presentation layering of data.

Traditionally, shared document control systems permit viewing, or "checking out" a complete document by a single user. Once checked out, a document is "locked" and may be edited only by one person at a time. An example of this is MS SOURCESAFE™, a system that allows multiple users to check out a document and simultaneously edit a document, referred to as CVS or "Concurrent Version System". This system merges changes back into the repository on a line-by-line basis after a particular user has checked in a document. Each user cannot see the changes that another user makes until all users have checked the file back into the repository. When two users check in a document where both users have changed the same portion of a file, a "collision" occurs, which requires time consuming review of the changes to determine which change (if either) should be retained. Since each user has his or her own local copy, changes that one user makes are not visible to the other user while the first user is in the process of making the changes. In addition, since CVS is generally used for change control with respect to software source code, it is generally more suited to content manipulation rather than presentation manipulation.

For at least the reasons described above there is a need for a multi-user document editing system and method that allows for users to simultaneously modify the presentation of a document simultaneously, or "in parallel."

BRIEF SUMMARY OF THE INVENTION

One or more embodiments of the invention enable multiple users to simultaneously edit the same document. Users may see the changes made by other users immediately. Each user is given the ability to control with a level of granularity what changes become immediately visible to other users. Access control is established with varying levels for each document and if authorized editors to a document may partially lock the document using varying types of locking. When a portion of a document is locked the user that was given the lock may make changes to the document without those changes being made visible to the other users until the lock is released. Embodiments of the invention provide varying types of document locks and further details about the different kinds of locking that are permitted are elaborated on in the detailed description.

A document may be represented as a set of discrete objects and each of these objects may be locked, (i.e., protected), edited, or checked in and saved separately. The discrete objects may be organized in a hierarchy. Each discrete object or node may be protected individually or may be protected recursively, which applies protection to all children of a node. The hierarchy may be multi-hierarchical. Each discrete node for example may belong to one or more hierarchies, such as a content hierarchy and/or a presentation hierarchy. To gain access to a discrete object, all hierarchies are navigated to allow for multiple editors to alter different aspects of the same portion of a document for example the content and presentation. Protection and check-out actions allow respectively for disabling any modifications and creating a private copy open for modifications only by the entity asserting the check out. Although the terminology and examples used herein are catalog oriented, embodiments of the invention may be utilized for locking and protecting nodes in a multi-hierarchical methodology to achieve concurrent access on multiple levels.

To modify document information as it is presented, control the modifications and view the modifications in parallel across multiple users editing the same document, systems implementing one or more embodiments of the invention make use of a model-view-controller design pattern. At least one implementation utilizes a first-in-first-out queue that accepts inputs such as modification request or changes from all users associated with a document and applies the changes in the order in which the changes arrive. Hence, if two users are editing the same word in the same paragraph, then the first user's change to the word shows up on the second user's screen while the second user is typing and if the second user then changes the word the changes from the second user are also displayed on the first user's screen.

When documents that are to be published make use of data from an underlying database it is generally advantageous for the document publication program to have the ability to take advantage of families of data. A family of data is generally a parameterized, defined subset of a set of records in a database that may be layered on top of an existing classification. Thus if a category field exists in a database, then a manufacturer ID field may further define a family. An example of this would be a printer category with several manufacturers. Each manufacturer in effect defines a separate family. A family definition table that includes a list of the fields and/or field values from a main data table may be utilized. This family definition table may also provide reference to a set of additional data, or "pivots," that can further define the family. With families of data, tables provide a centralized view of a product, much as a product catalog provides tables of specific information to clarify the consumer's options.

Embodiments of the invention implement a methodology that enables changes to a document to be automatically propagated to all users editing or viewing the presentation and/or the underlying content data. Using the system described herein users are given a way to control the changes that are shown to others by having the ability to check in/check out documents with successively granular levels of control over presentation related information. Changes to the backend database may include changes to parameters and characteristics associated with family data and/or a family hierarchy with real-time update of publication WYSIWYG pages, for example. In effect, embodiments of the invention enable parallel editing as opposed to existing editors that serially edit content, (or content mixed with presentation data) one user at a time.

By allowing multiple users to alter the various presentation layer characteristics of a document in parallel, rapid document generation is achieved. For example, changing the pivots associated with a family allows for completely different table views to be utilized in viewing a family of information. The presentation layer allows for the viewing of any type of object that a document may contain. When one user is changing the pivots of a family and another user is changing the layout of the icon used to represent the family, then the document is, in effect, generated in parallel. Instead of waiting constantly for other users to finish editing information before other edits can be made, the typical serial editing methodology is transformed by embodiments of the invention into a parallel methodology that greatly increases throughput and lowers the costs associated with large publications.

In addition to permitting the alteration of family-related information, the grouping of pages (referred to as a "spread") may be edited in parallel. Another level of granularity lower, the system may perform edits in parallel of presentation layout of several pages at once. Yet another granularity level lower the system is configured to enable edits in parallel of presentation objects, and the characteristics associated with presentation, on an object-by-object level. For example, moving an icon presentation object on a first screen associated with a first user shows the same icon moving on a second screen associated with a second user. In one or more embodiments of the invention, the family, spread, presentation layer and presentation objects may be locked (i.e., protected), edited, checked back in, and saved. The protection of presentation levels may occur on one or more family, spread, presentation layer or presentation object simultaneously. In one or more embodiments of the invention, visual cues are given that a layer is protected by "graying out" the screen region associated with the locked data. However any other method of indicating that a family, spread, presentation layer or presentation object is currently protected, checked out or available for modification is in keeping with the spirit of the invention. Presentation objects as utilized herein may pertain to any text, graphic, or any other viewable entity.

BRIEF DESCRIPTION OF THE DRAWINGS

The above and other aspects, features and advantages of the invention will be more apparent from the following more particular description thereof, presented in conjunction with the following drawings:

FIG. 2 shows a presentation of a document in a presentation window that includes a publication tree view showing families, a family view, spread view and presentation objects view as displayed on a first computer.

FIG. 4 shows popup in family view having protection and check in/check out menu items with the check out family menu item shown as selected.

FIG. 7 shows a first computer editing family data while a second computer presents an alternate view of the family data that is uneditable.

FIG. 9 shows the rollback to original unmodified data on both the first and second computer using the same view of the family data.

FIG. 16 shows a modification to the presentation layout and a check in of the presentation layout on a first computer.

DETAILED DESCRIPTION

A more complete description of the multi-user document editing system and method now follows. In the examples provided herein numerous specific details are set forth in order to provide a more thorough understanding of embodiments of the invention. It will be apparent, however, to an artisan of ordinary skill that the present invention may be used without incorporating all aspects of the invention described herein. In other instances, specific features, quantities, or measurements well known to those of ordinary skill in the art are not described in detail so as to illuminate the essence of the invention. Readers should note that although examples of the invention are set forth herein, the claims, and the full scope of any equivalents, are what define the metes and bounds of the invention.

Figure 1:
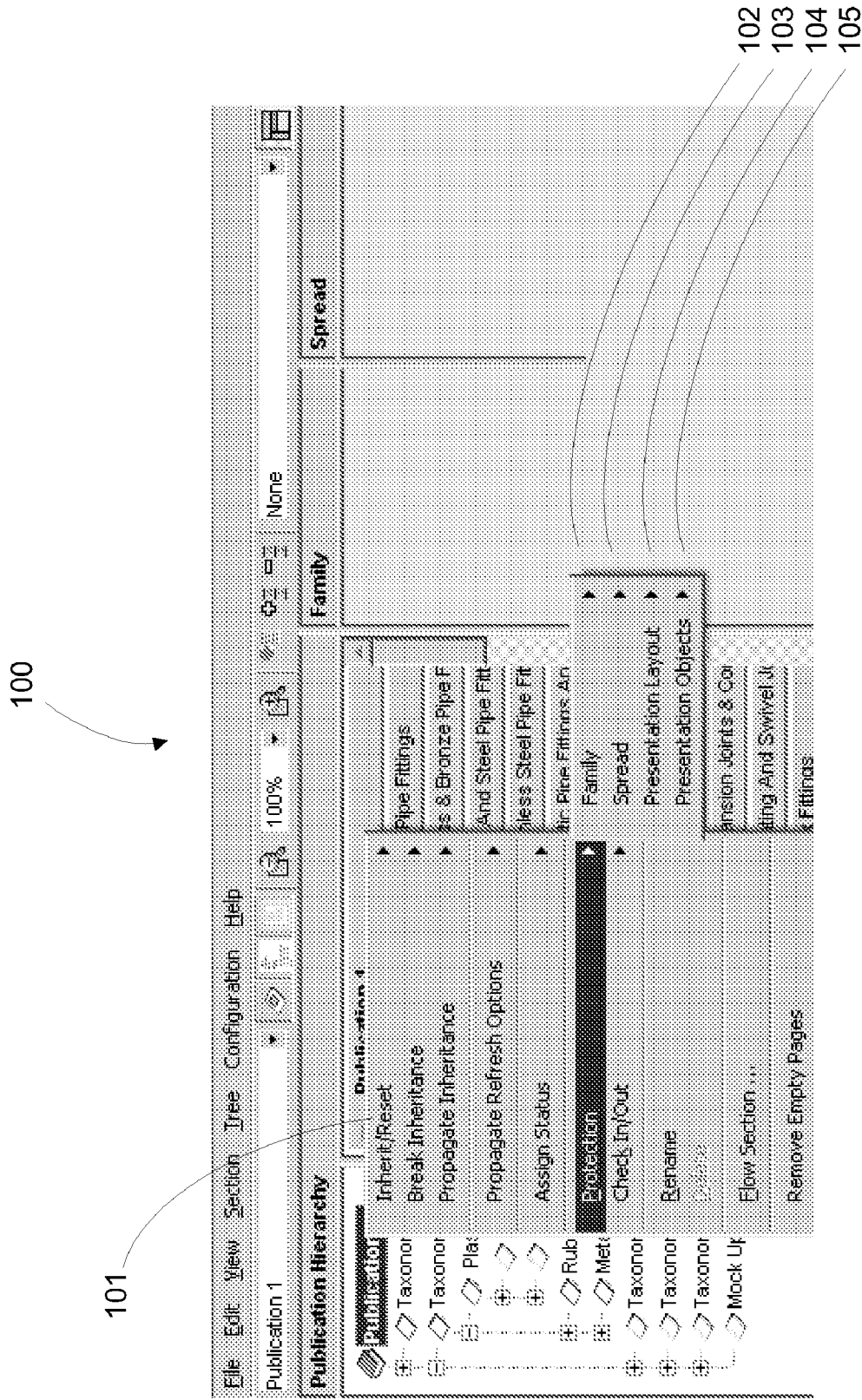
FIG. 1 shows a presentation window with a popup menu showing family, spread, presentation layout and presentation objects protection menu items.

FIG. 1 illustrates presentation window 100 with a popup menu 101 comprising family 102, spread 103, presentation layout 104 and presentation objects 105 protection menu items. Users utilize this popup menu 101 to control with a definable level of granularity which aspects of family 102, spread 103, layout 104 or objects 105 are protected from changes by other users or checked in for changes by the operating user. Alternatively, if a particular portion of a document is not protected, for example if it has not been finalized, then any modification performed on any computer is propagated to all other computers where it is observable by users simultaneously viewing the changed portion of the document. The modification to the presentation data (and content if desired) is parallel in nature as opposed to the typical modification of content that other editors use, i.e., serial editing. Embodiments of the invention permit multiple users to modify a document in parallel which greatly speeds the creation of large documents such as product catalogs.

One embodiment implements the propagation of modification requests or changes by sending user interface gestures to a controller on a server that is configured to accept the user interface gestures on a first-in-first-out (FIFO) basis. Any FIFO that allows one process at a time to input a user interface gesture may be utilized. In addition, any type of FIFO or other data structure can be utilized so long as a semaphore or other type of lock is utilized to provide ordered access to the FIFO. Hence, any user interface gesture or command that is received at the FIFO is received in whole before accepting another user interface gesture associated with a second user. Once an input to the FIFO is accepted, it is processed in order, and protection for an object associated with the command is checked on a granularity level associated with the object. Checking protection on at least one granularity level allows for determining if the object attempting to be modified is part of a locked family, or a finer granularity such as a child of a family for example. The model (i.e., database) is updated if there is no lock on the object and the modification is sent to all displays associated with a particular document for example. Any type of communication may be utilized to accept and transfer changes to and from all computers associated with a document. For example, TCP/IP may be one communication implementation that may be utilized to couple multiple computers to a server. As will be described in conjunction with the remaining figures, there are many levels of granularity that embodiments of the invention are configured to utilize.

Figure 2:
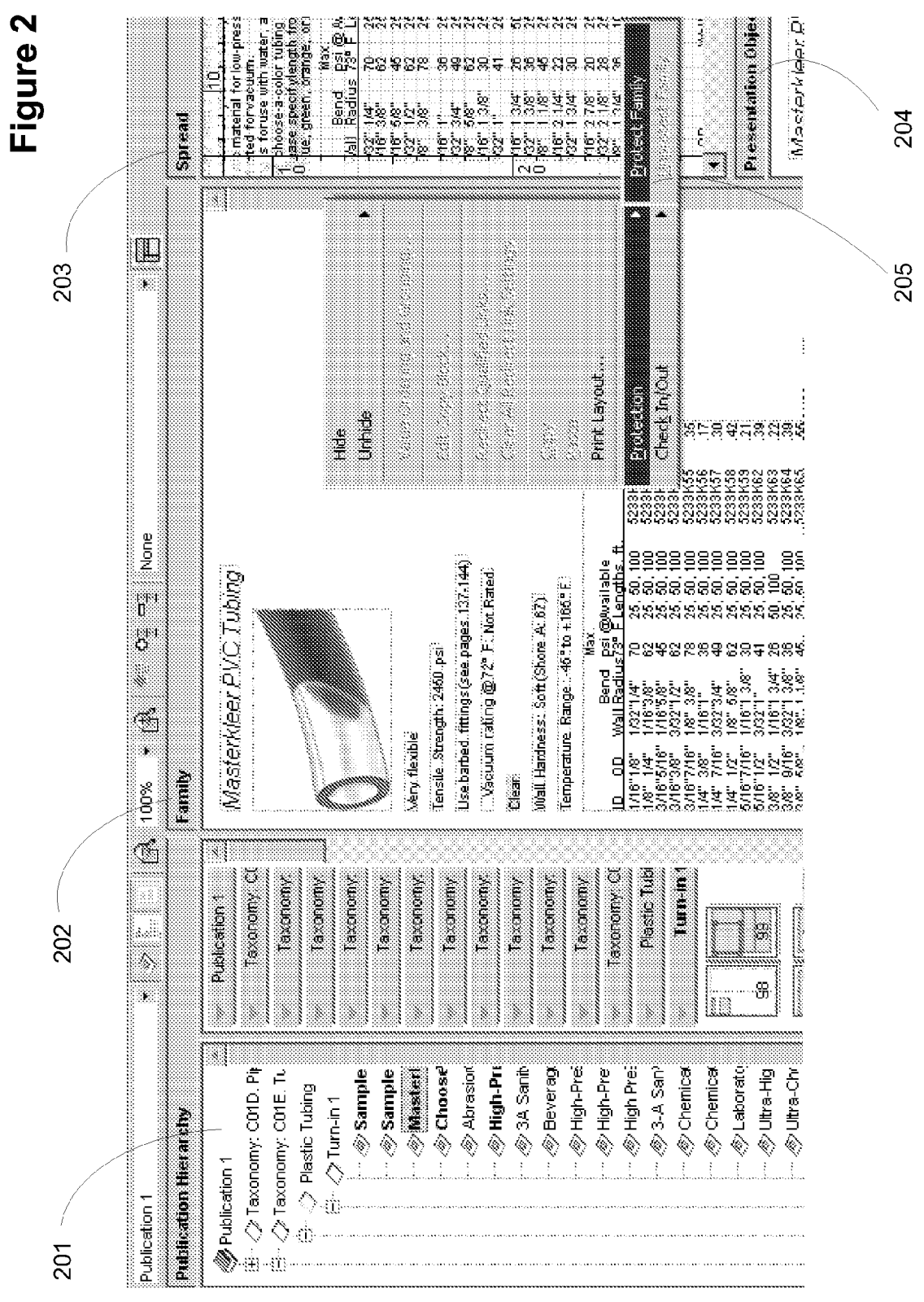

FIG. 2 shows a presentation of a document in a presentation window that includes publication tree view 201 showing families in the tree, family view 202 showing the family selected in publication tree view 201, spread view 203 and presentation objects view 204 as displayed on a first computer. The family protection menu item 205 is shown being selected. Any other method of displaying multiple levels of presentation data associated with a document is in keeping with the spirit of the invention.

Figure 3:
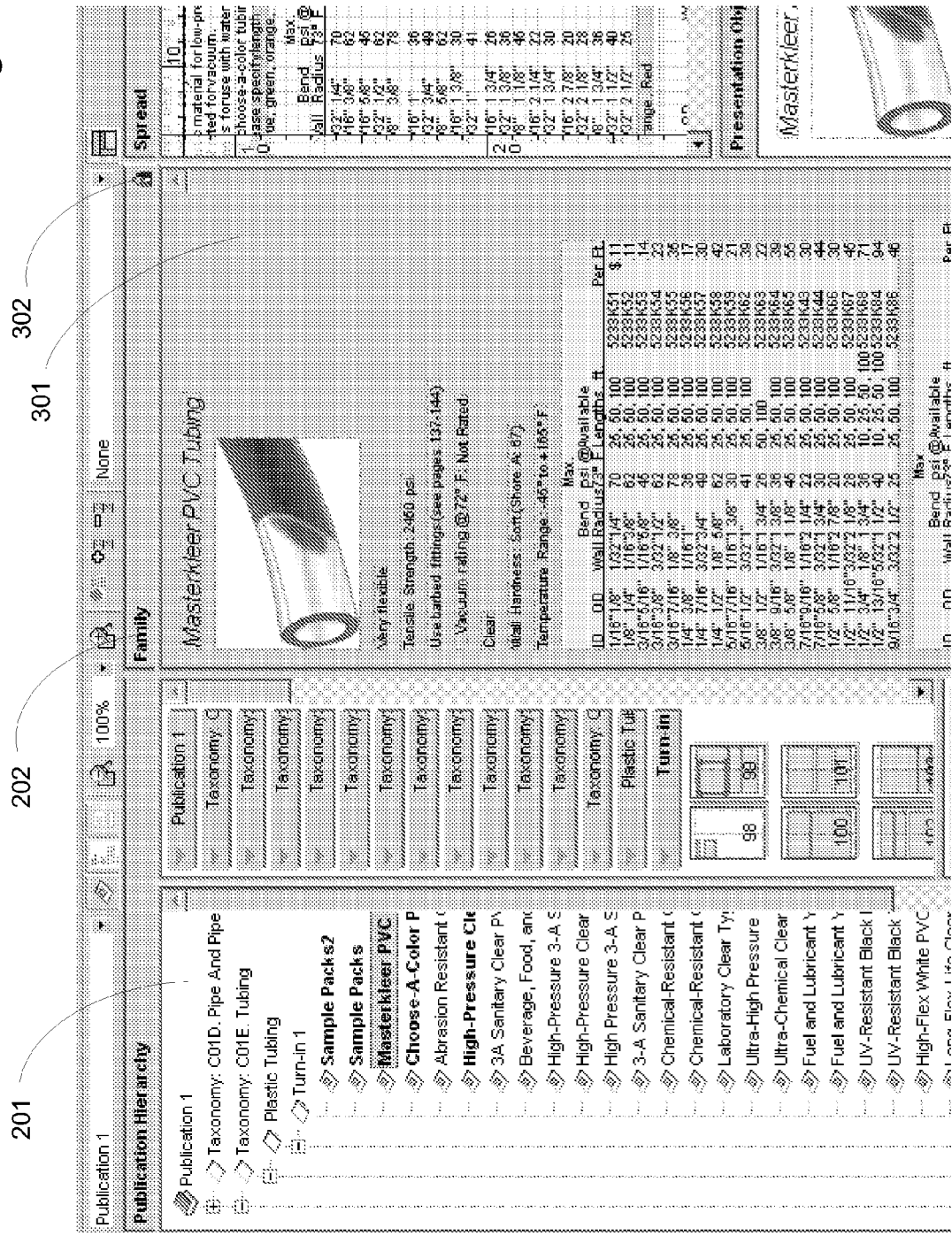
FIG. 3 shows locked family view as grayed out and view family locked icon.

FIG. 3 illustrates locked family view 202 as protected via family protection menu item 205 in FIG. 2. Family view 202 is depicted as grayed out as per gray area 301 to signify that it is protected, and family locked icon 302 is displayed as an iconic lock.

Figure 4:
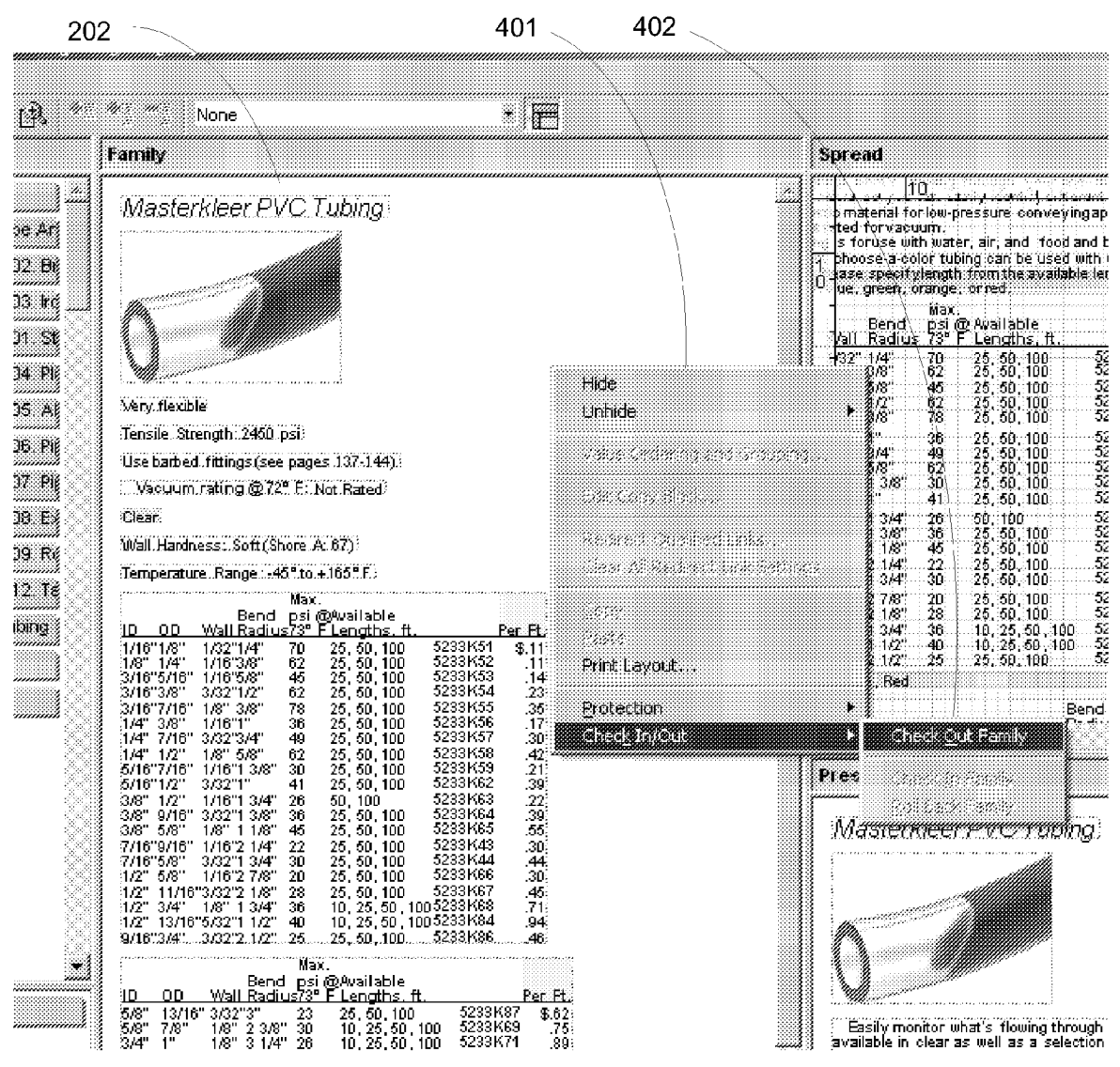

FIG. 4 illustrates popup 401 in family view 202 having protection, and check in/check out menu items with the check out family menu item 402 shown as selected. Selecting check out family menu item 402 enables the modification of the family data on a first computer while locking out other users from requesting modification of the information.

Figure 5:
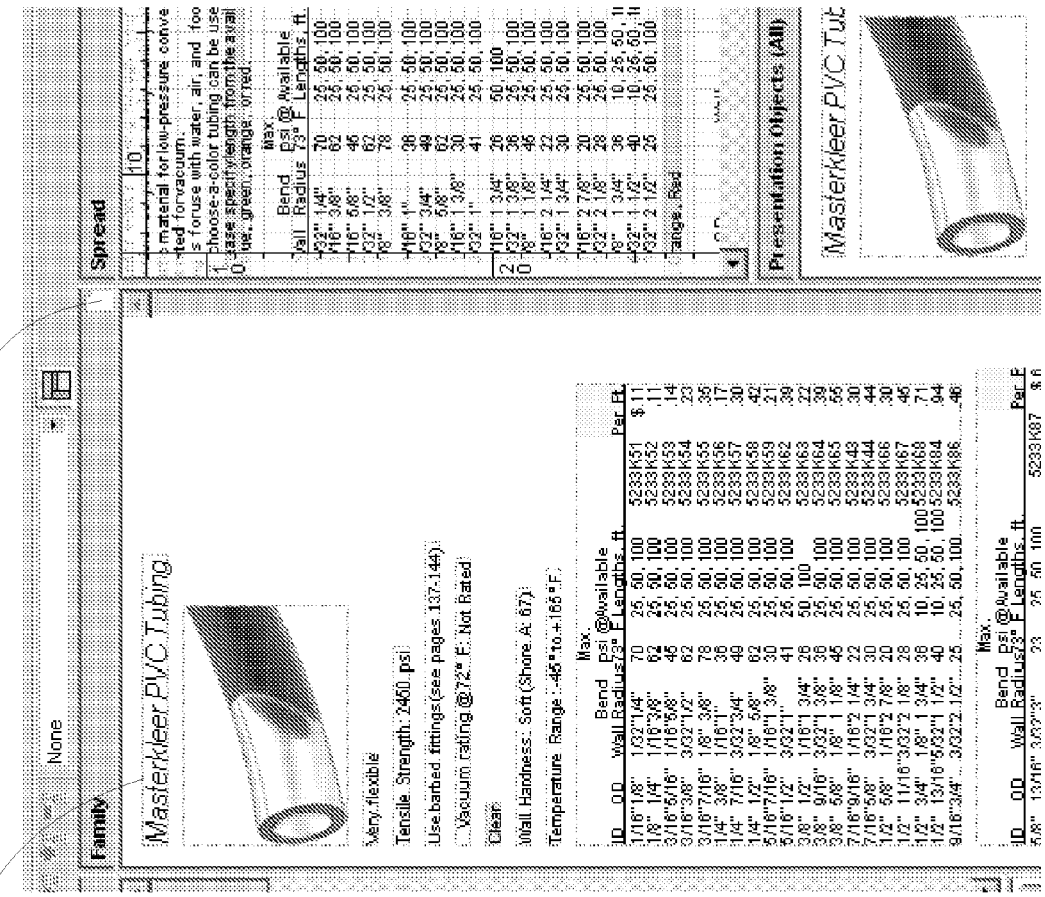
FIG. 5 shows checked out flag with family view as editable on a first computer.

FIG. 5 shows checked out flag 501 with family view 202 as editable on a first computer. Readers should note however that any other method of presenting edit status to a user is in keeping with the spirit of the invention. Any characteristic of a family may be edited by the owner of the lock on the family (or group of families) selected in publication tree view 201. Family related characteristics may include setting of pivots for tables in the family for example, or sparse field designators such as qualifiers that allow for more dense presentation of information related to a family. Any item related to the presentation on a family granularity level is settable in keeping with the spirit of the invention.

Figure 6:
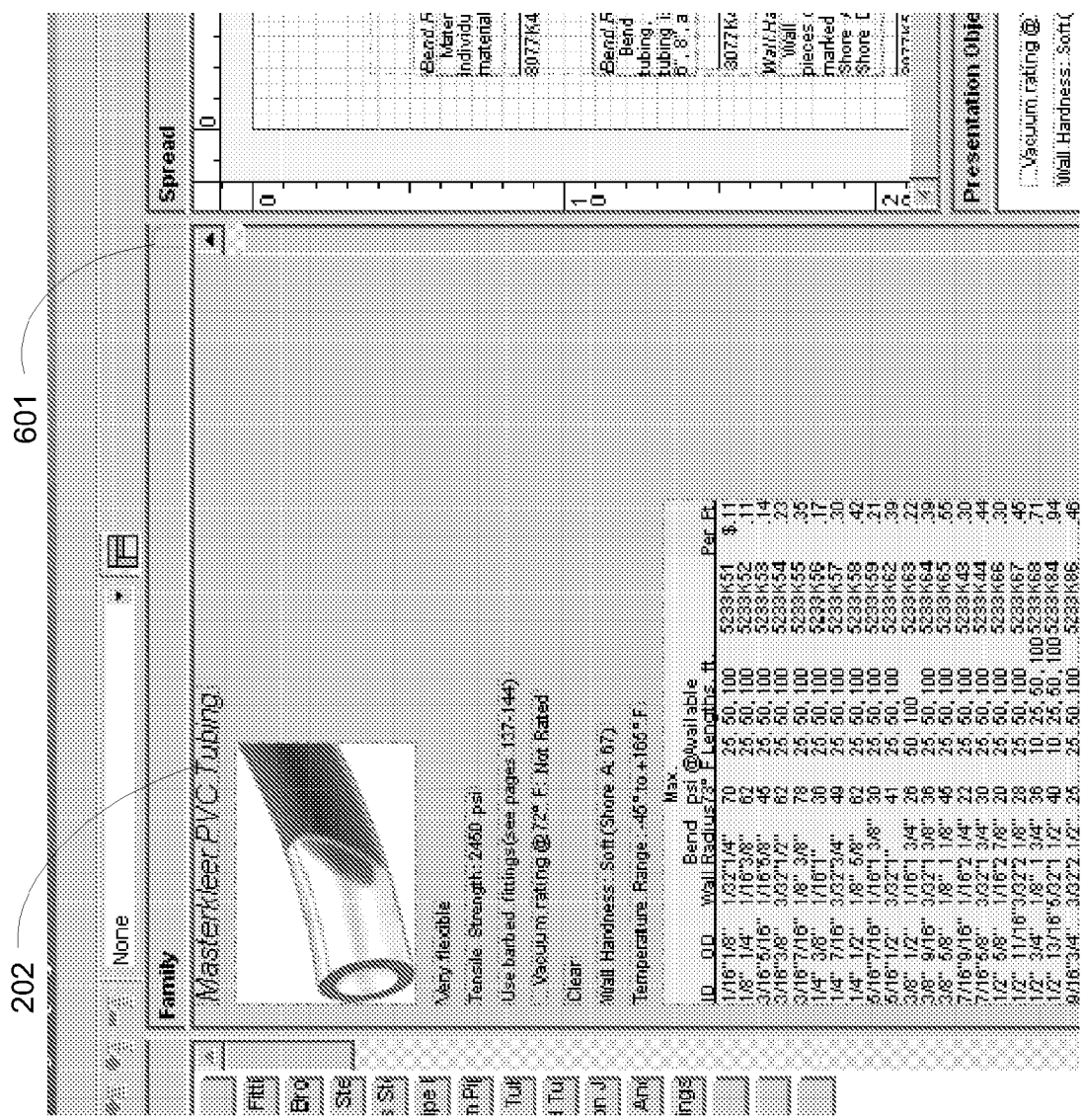
FIG. 6 shows a second computer display of family view shown as uneditable after checked out via FIG. 5 on a first computer.

FIG. 6 illustrates a second computer display of family view 202 shown as uneditable after checked out via FIG. 5 on a first computer. Checked out icon 601 shows that another user has checked out the family for editing. As there are numerous other families in the document as shown in publication tree view 201, the user of the computer may move on to edit another family while the first user is editing the family shown in FIG. 6.

Figure 7:
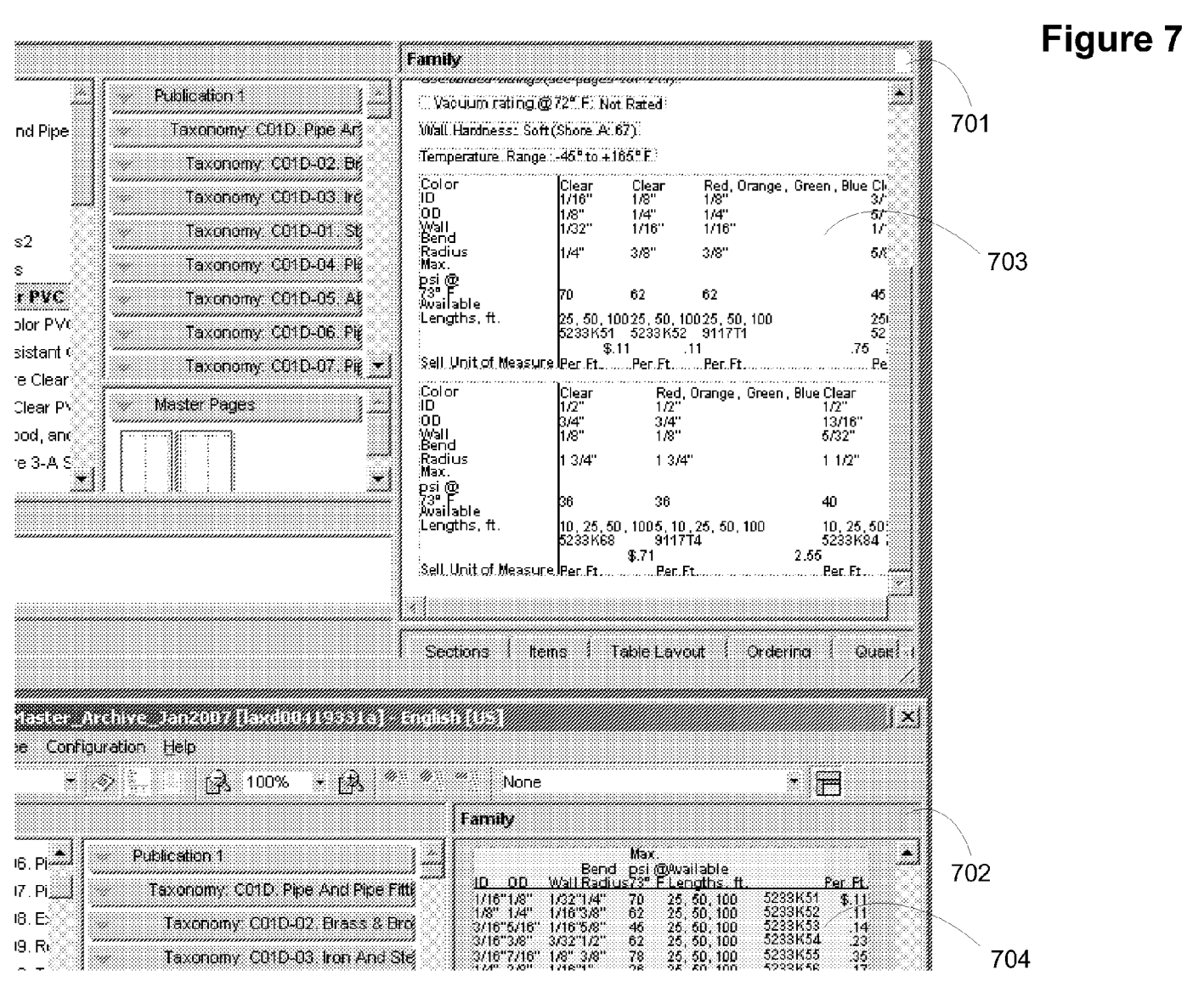

FIG. 7 depicts a first computer editing table properties of the family data at 703 while a second computer presents an alternate view of the family data that is uneditable at 704. Icon 701 shows editable status while icon 702 shows uneditable status. Although two users are viewing different views of the same family data, only the user that has checked out the family data may edit it. However, had neither user checked out the family data, then both users would be free to request modification to the family data with accepted modifications being displayed on the first and second computer as they occur.

Figure 8:
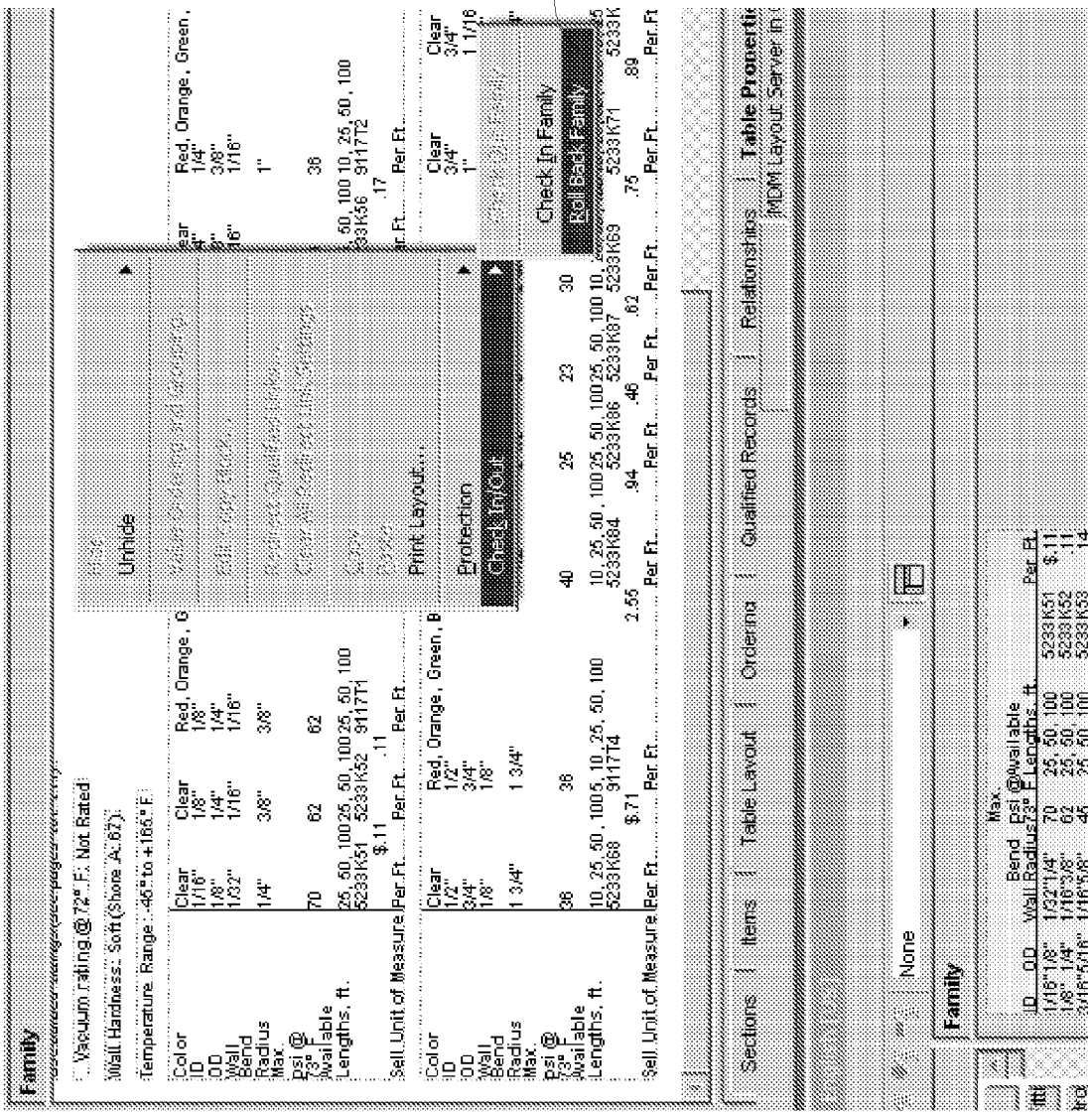
FIG. 8 shows a rollback of changes on a first computer which propagates the original unmodified data object in all family views on all computers viewing the document including the second computer at the bottom of the figure.

FIG. 8 shows a rollback of changes on a first computer, which propagates the original unmodified data object in all family views on all computers viewing the document, including the second computer at the bottom of the figure. Any changes made since the family was checked out are rolled back to the original state and displayed on all computers. For example, had the label associated with temperature change been altered by the first user with modifications displayed on all other computers viewing the same data, the data returns to its original unmodified state if "rollback" is selected via rollback menu item 801. With rollback selected, the data is displayed in the original unmodified form on all computers viewing the data. In one or more embodiments, the first computer retains the checked out status and may begin modifying the family data again. This also applies to all other granularity levels of the presentation information related to the document.

Figure 9:
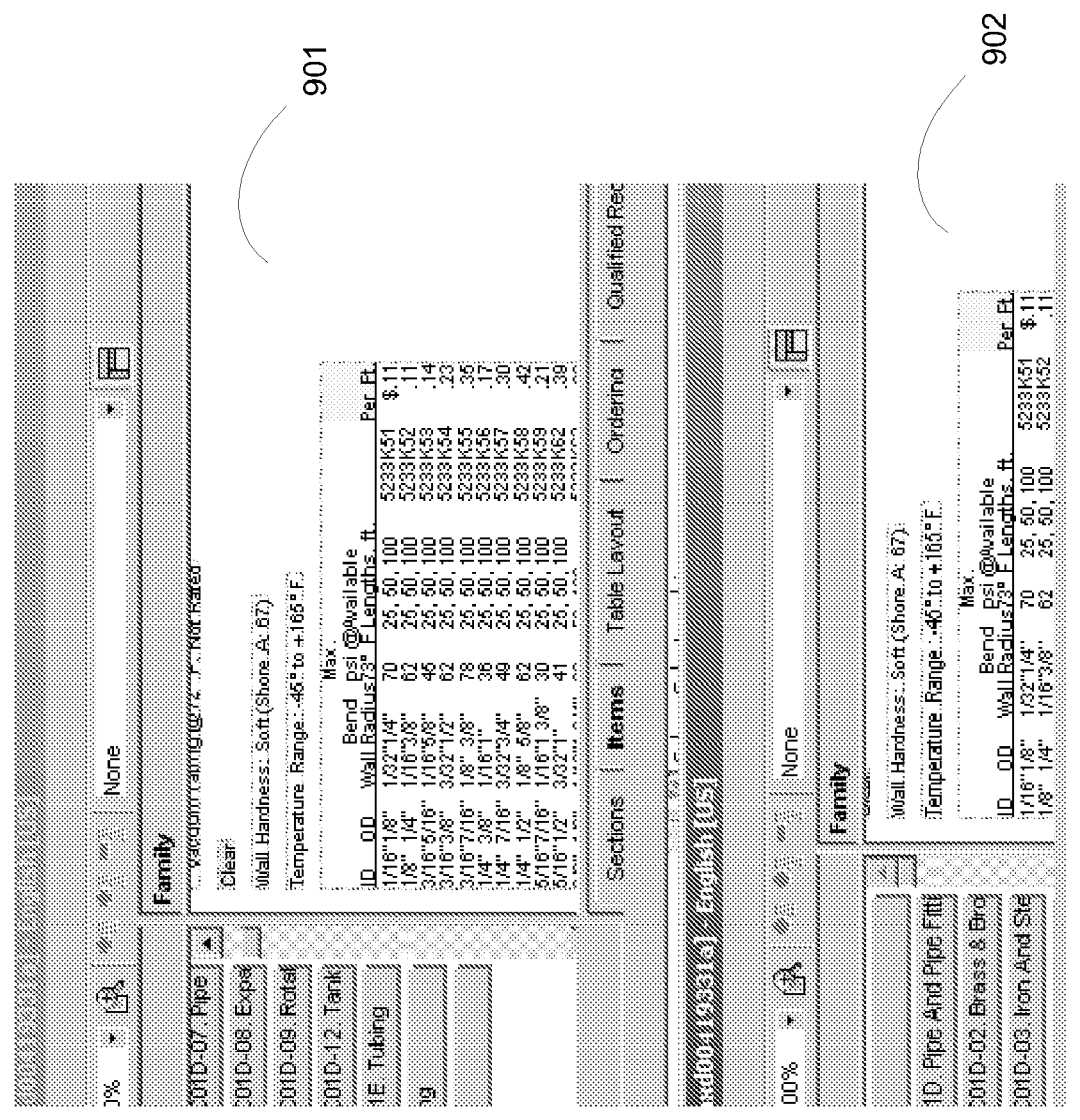

FIG. 9 illustrates the rollback to original unmodified data on both the first and second computer using the same view of the family data as per unmodified data 901 and 902 respectively. As stated in the description of FIG. 8, the data is displayed as the original unmodified data. In one or more embodiments of the invention, the original view may be redisplayed to show the particular view of the family data that was being displayed previously. Alternatively, the particular view may remain visible in order to show the data in the selected manner. So long as the presentation data is returned to its original unmodified state, rollback is successfully accomplished, leaving data 901 and 902 as if it were never modified.

Figure 10:
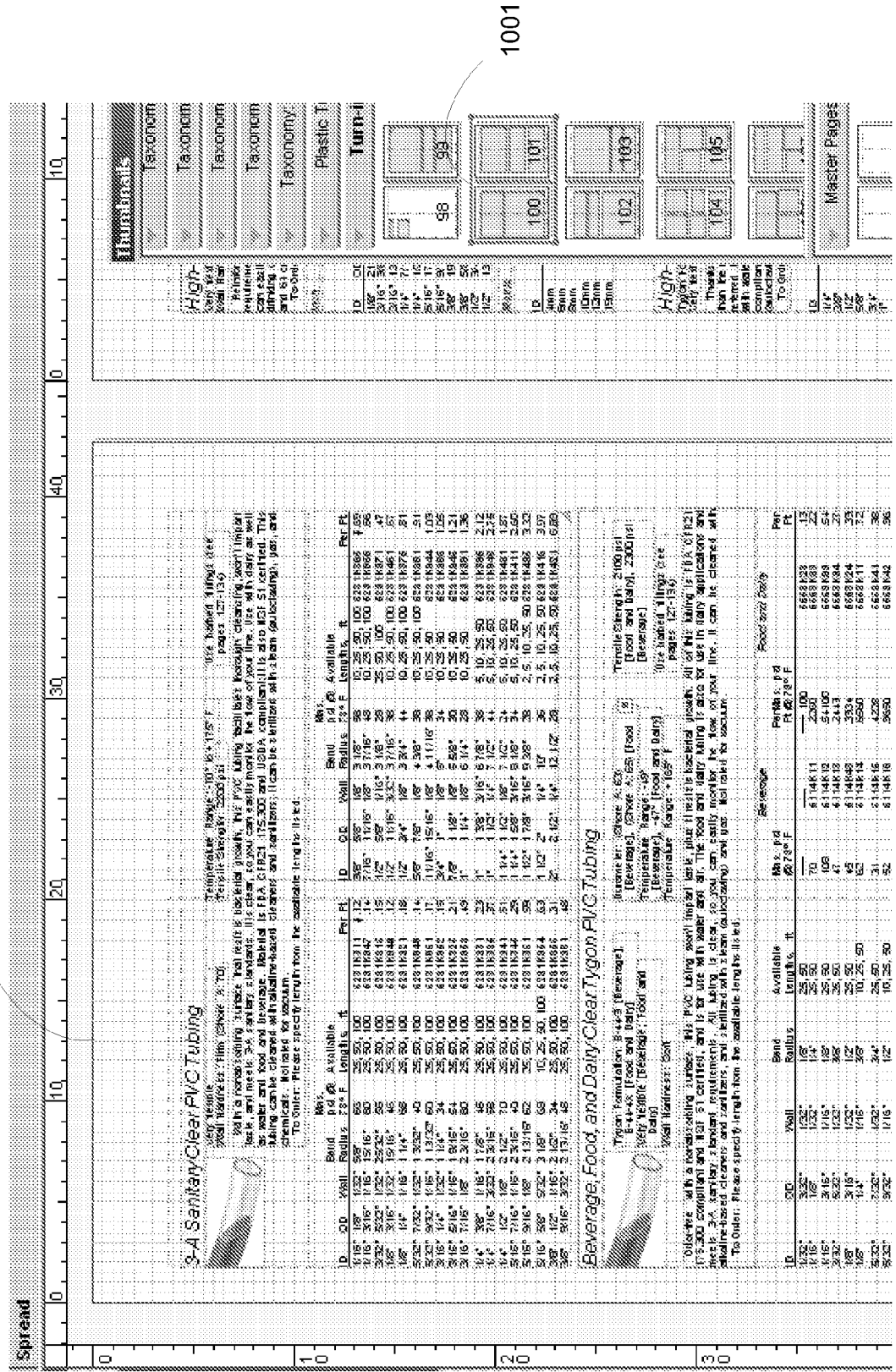
FIG. 10 shows a two page spread and an icon view of the spread on the right of the figure.

FIG. 10 shows a two-page spread and an icon view of the spread on the right of the figure. Spreads are at the granularity level of groups of pages. In this figure, spread 1001 is selected and displayed in spread view 1002. Any number of pages may constitute a spread.

Figure 11:
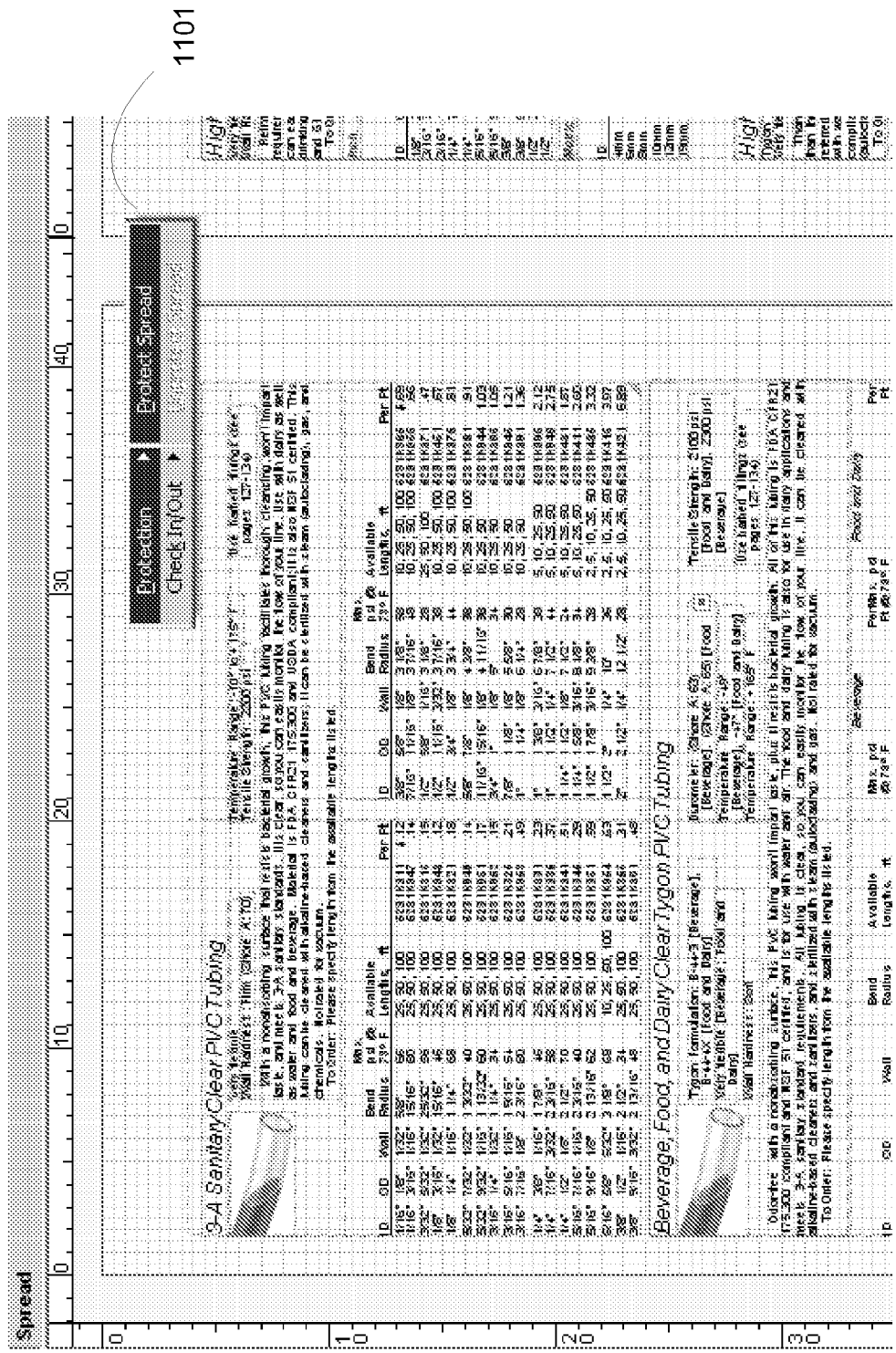
FIG. 11 shows a popup for setting the protection for the spread.

FIG. 11 depicts popup 1101 to initiate setting the protection for the spread. Once the spread is protected, no one may alter the spread since the spread is considered finished. Setting the protection for any other presentation granularity level is accomplished in the same manner in one or more embodiments of the invention. Any other method of setting the protection including menus, icons or any other graphical user interface element is in keeping with the spirit of the invention.

Figure 12:
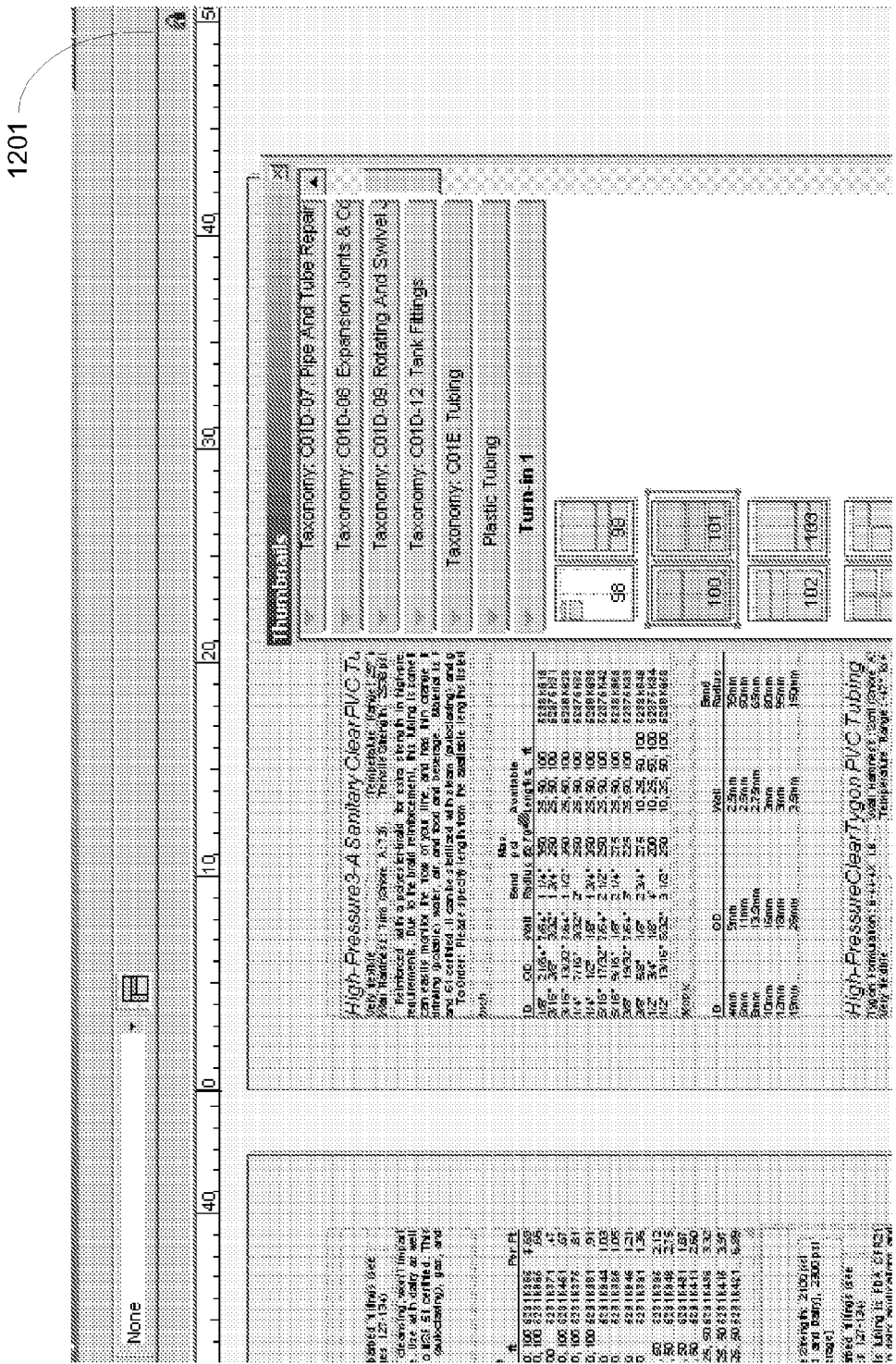
FIG. 12 shows the spread as uneditable since it is protected as per FIG. 11.

FIG. 12 shows the spread as uneditable since it is protected as per FIG. 11. Specifically, spread locked icon 1201 is shown as a small lock. Alternatively, or in combination the spread view may be grayed out. This signifies that the present user cannot modify the spread data without first checking out the spread data.

Figure 13:
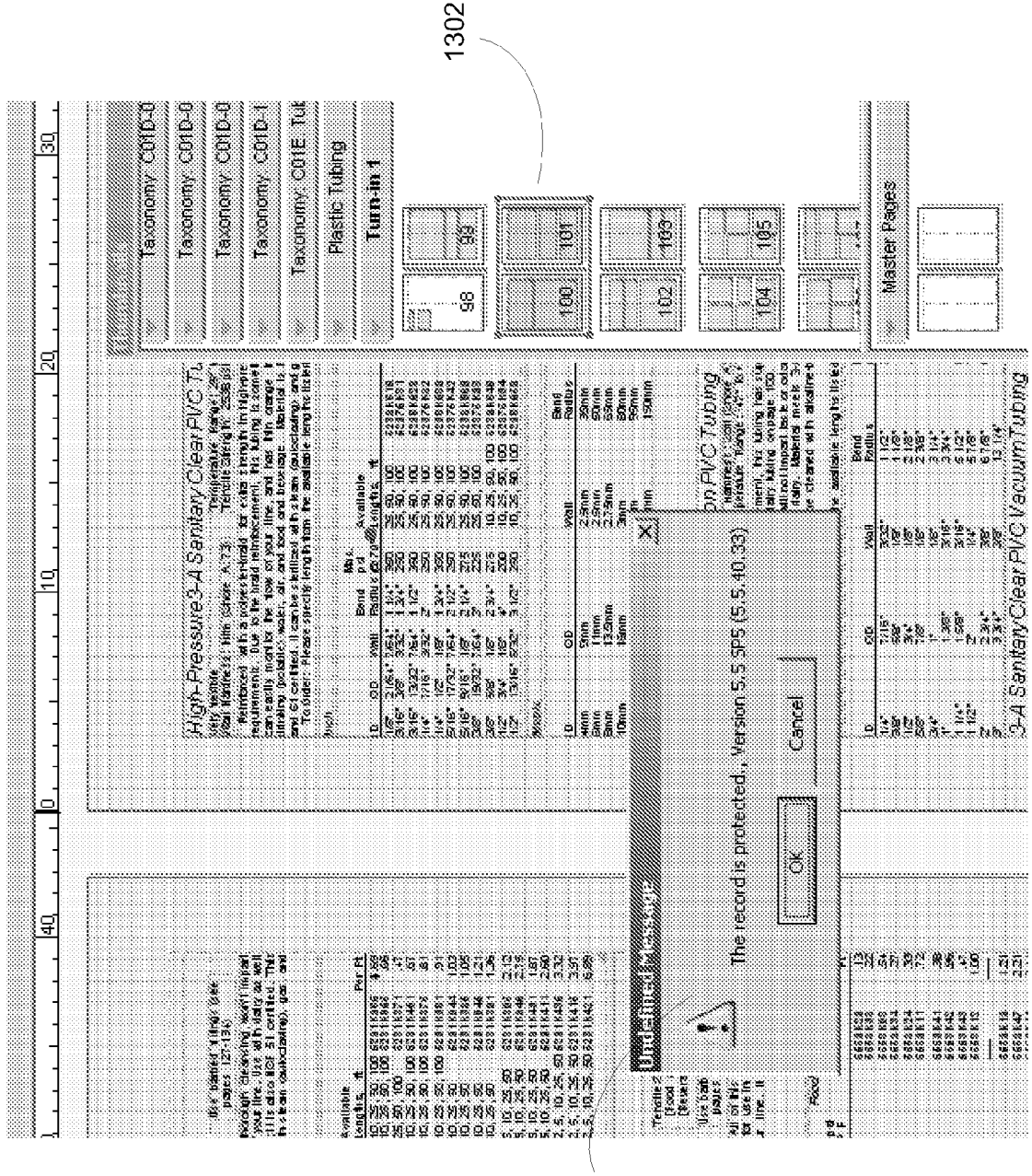
FIG. 13 shows the popup that is displayed when a modification request for the spread is accepted and checked, wherein the modification request is denied.

FIG. 13 illustrates popup 1301 that is displayed when a modification request for the spread is accepted and checked, wherein the modification request is denied. For example, if a user attempts to add a page within the spread or move the spread or delete a page within the spread, popup 1301 is displayed. A page may be added to another spread that is not locked, however. A quick review of spread thumbnails 1302 shows the spreads that are locked and not locked (or editable and non-editable) in one or more embodiments of the invention. In other embodiments of the invention, a username may be displayed on a mouse-over of the locked or checked out spread to display the username of the person that is editing (or who has protected) the spread. Right clicking on the protected or uneditable spread may present an instant message window or email window to allow a second user to ask a first user a question regarding the locked or edit status of a particular granularity level, such as the spread level.

Figure 14:
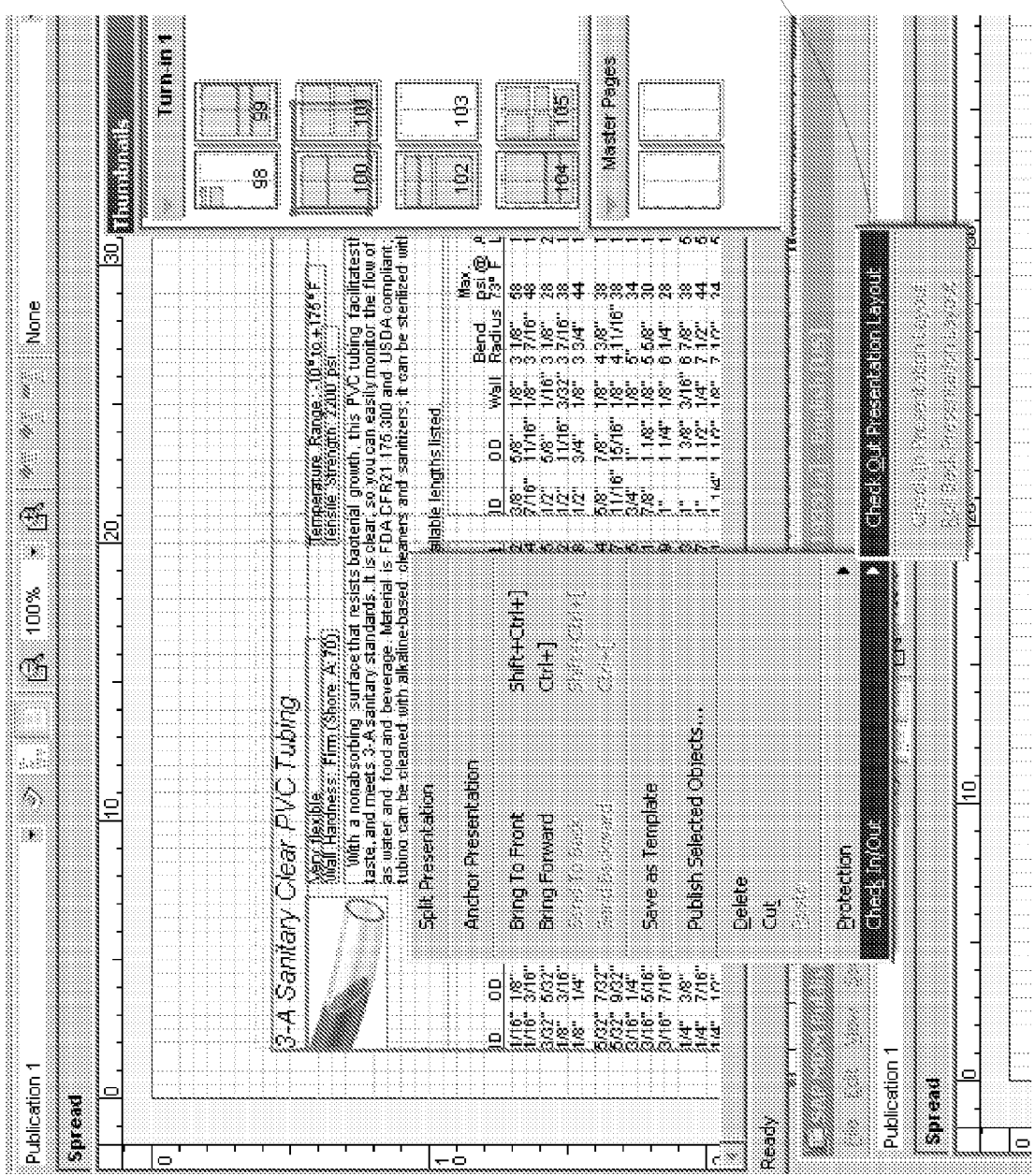
FIG. 14 shows a popup for checking out the presentation layout.

FIG. 14 shows popup 1401 for checking out the presentation layout. At this granularity level the presentation characteristics within a page may be modified. By checking out the presentation layout on a first computer, the user associated with the computer is allowed to edit the presentation layout data.

Figure 15:
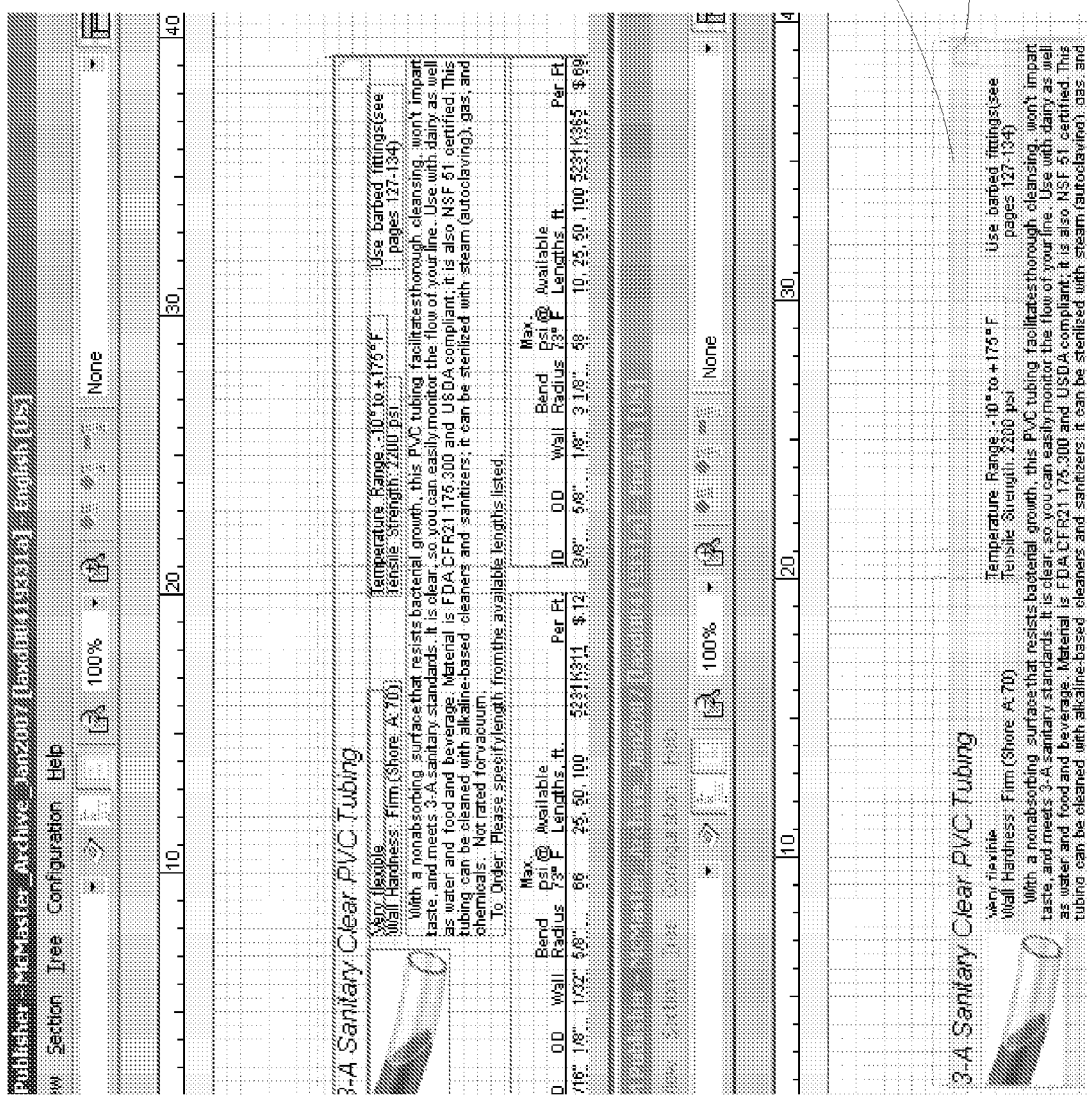
FIG. 15 shows the spread on a second computer as uneditable.

FIG. 15 shows the spread on a second computer as uneditable. In one or more embodiments the presentation layout data on a second computer (the bottom screen in FIG. 15) is shown as grayed out as per gray background 1501. As with family or spread data, a lock icon may be used alternatively or in combination with grayed out areas as per icon 1502.

Figure 16:
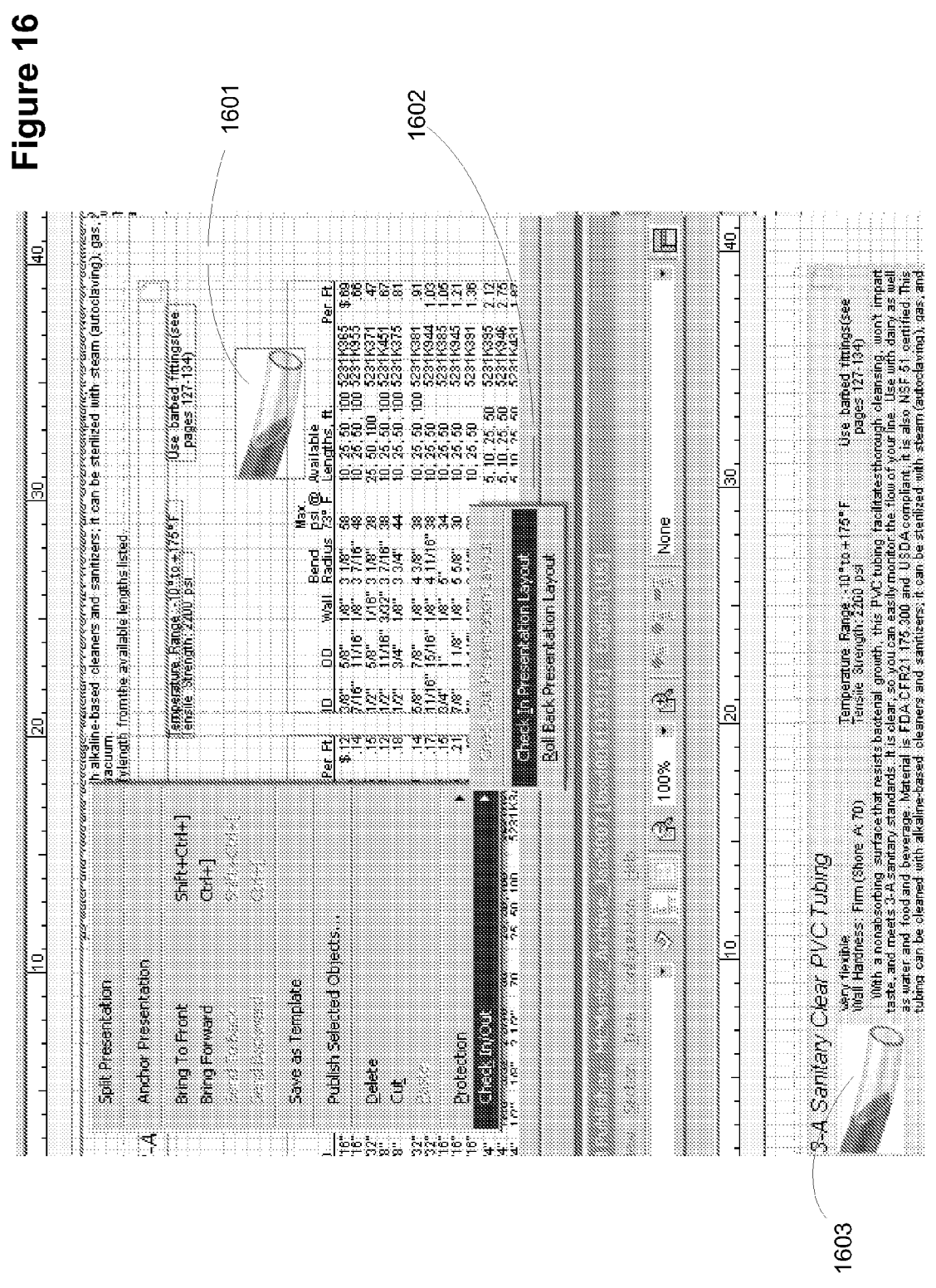

FIG. 16 shows a modification to the presentation layout and a check in of the presentation layout on a first computer. Specifically, icon 1601 is moved to a new location on the right side of the presentation layout window. When the presentation layout is checked in, as per menu 1602, icon 1603 has the modification request applied to it. This results in the display of FIG. 17.

Figure 17:
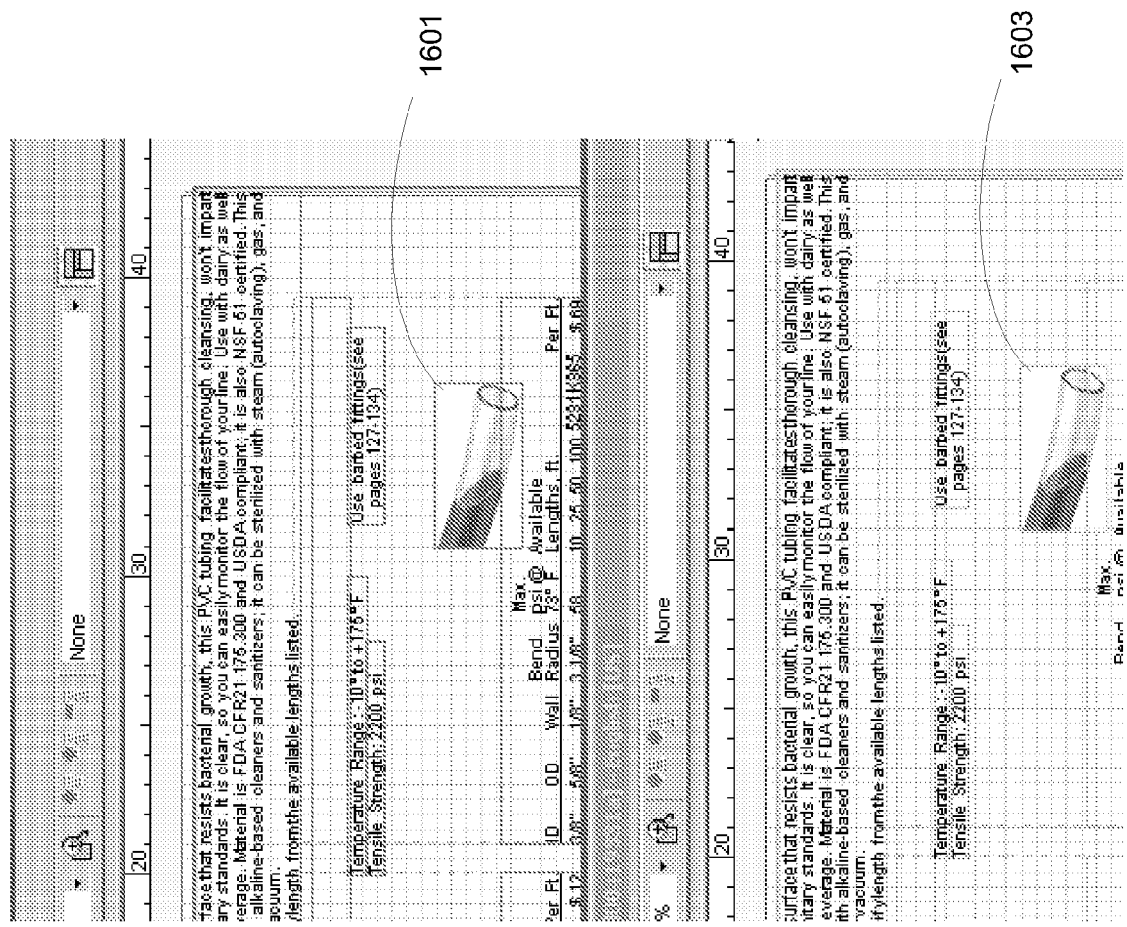
FIG. 17 shows the display of the modified object on the second computer.

FIG. 17 shows the display of the modified object on the second computer. Not only can modification requests related to movement be performed, but deletion of objects, addition of objects and alteration of objects, e.g., stretch, rotation, resize, etc., can be performed. As shown, the modified icon position of icon 1601 is applied to icon 1603.

Figure 18:
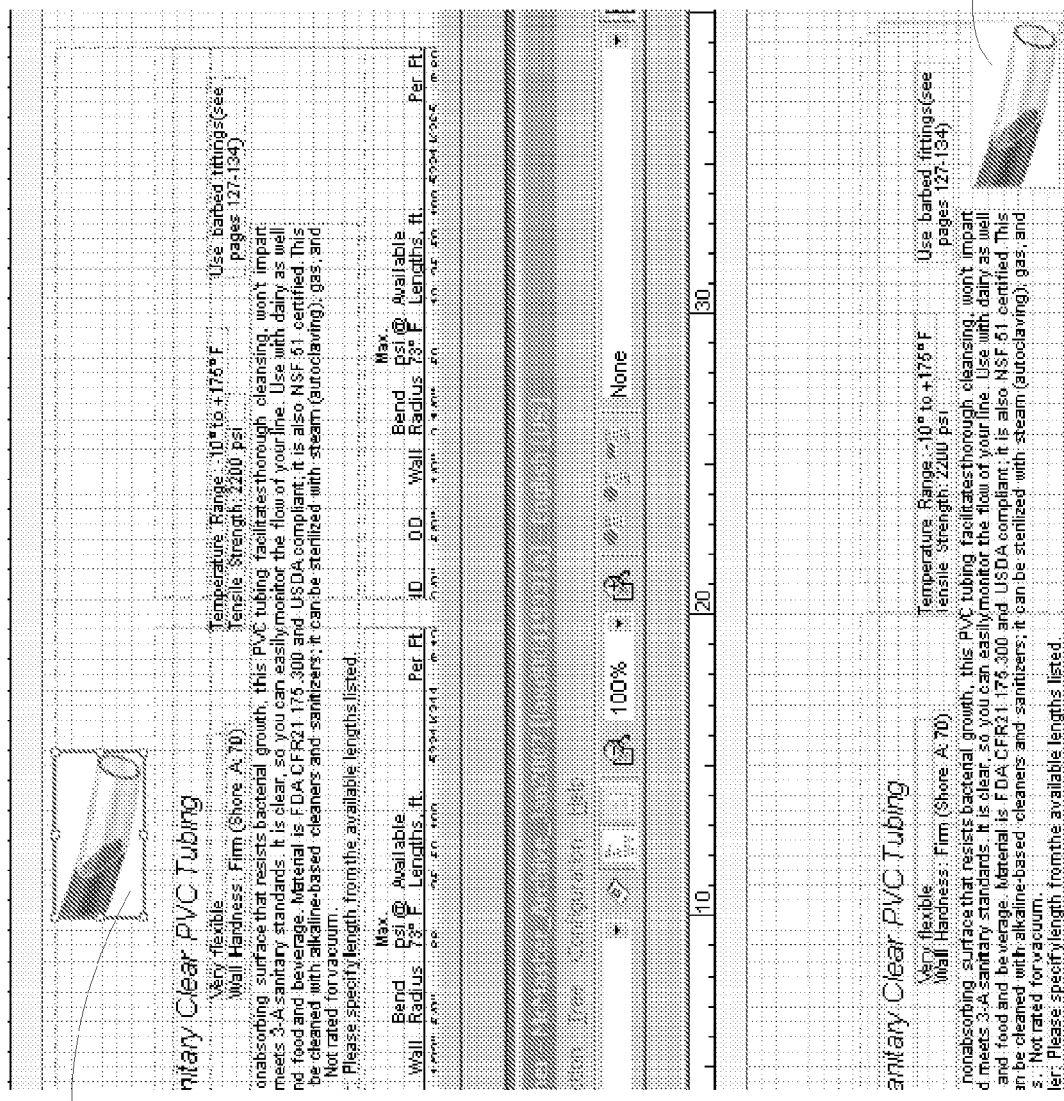
FIG. 18 shows a modification to the position of a presentation layer on a first computer wherein the presentation layer is not checked out.

FIG. 18 shows a modification to the position of a presentation layer on a first computer wherein the presentation layer is not checked out. In this case, icon 1601 is dragged to a new location and 1603 remains located at the right side of the figure until the mouse is released on the first computer. Alternatively, real-time position changes may be broadcast to all computers viewing the data, however, the network utilization for constant real time positioning may warrant the broadcast of final modification positions, for example.

Figure 19:
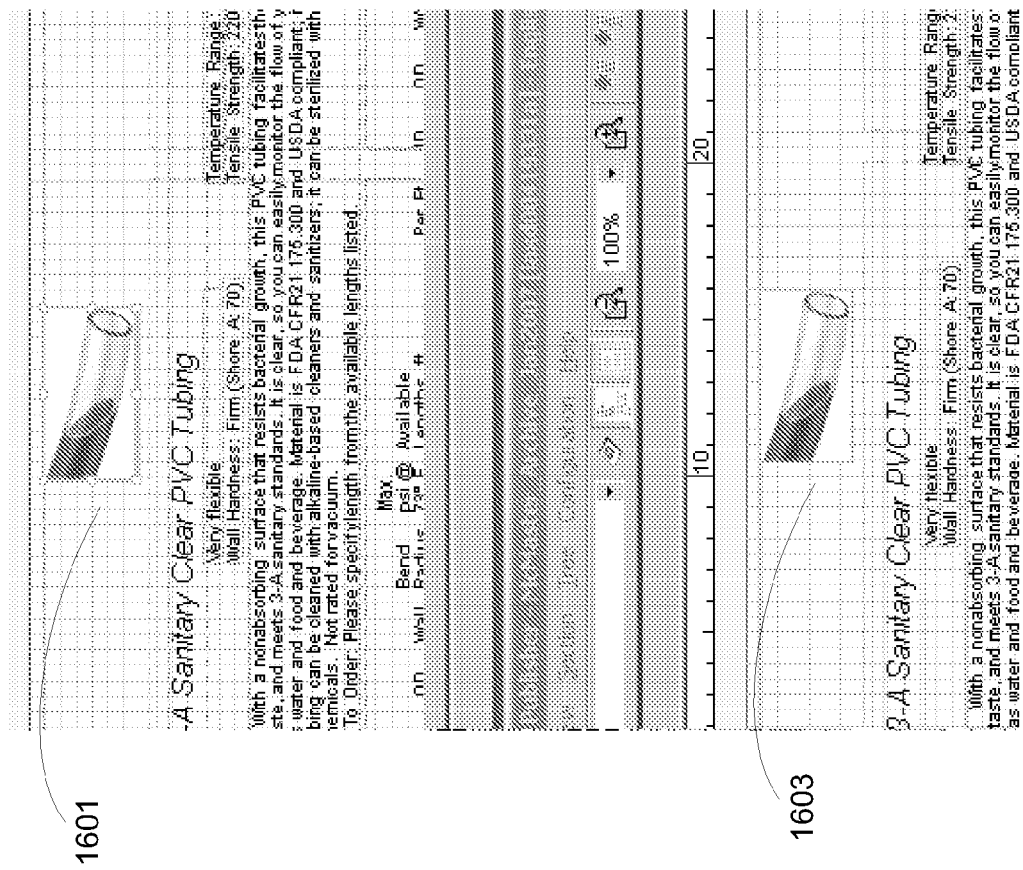
FIG. 19 shows the result of the modification to the position of the presentation layer on the first computer after the object is "dropped" with the modification displayed on the second computer.

FIG. 19 shows the result of the modification to the position of the presentation layer on the first computer after the object is "dropped" with the modification displayed on the second computer. Again, in other embodiments of the invention, icon 1601 and 1603 may track each other in real-time if all movement messages are broadcast to all computers. For lower network bandwidth, icon 1603 tracks icon 1601 when the mouse is released on the first computer.

Figure 20:
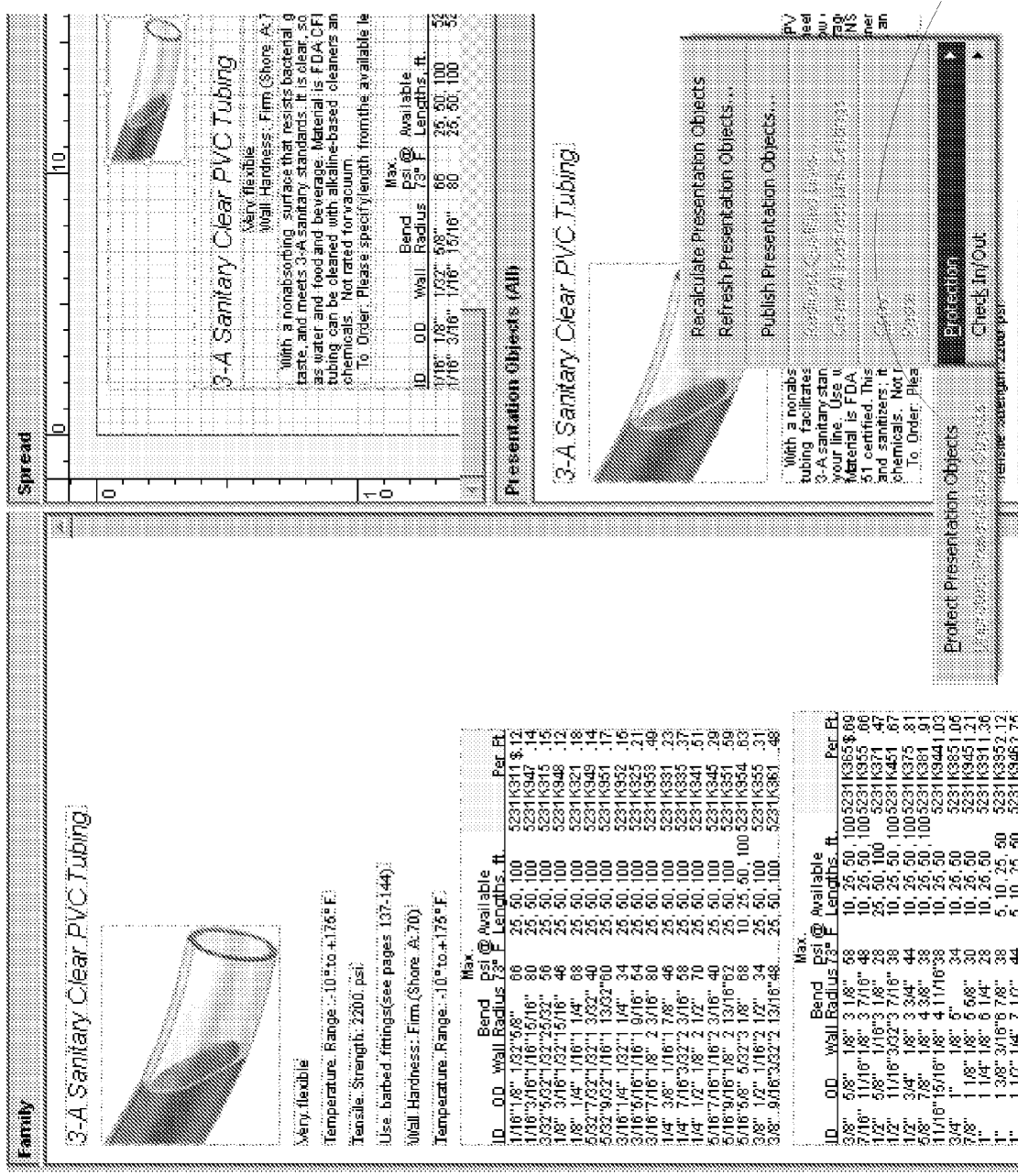
FIG. 20 shows the protection of presentation objects.

FIG. 20 shows the protection of presentation objects via presentation object protection menu item 2001. This allows for protecting individual items on a page for example. Thus, portions of a page may be protected once finalized, while other portions of a page remain open to one or more users to modify.

Figure 21:
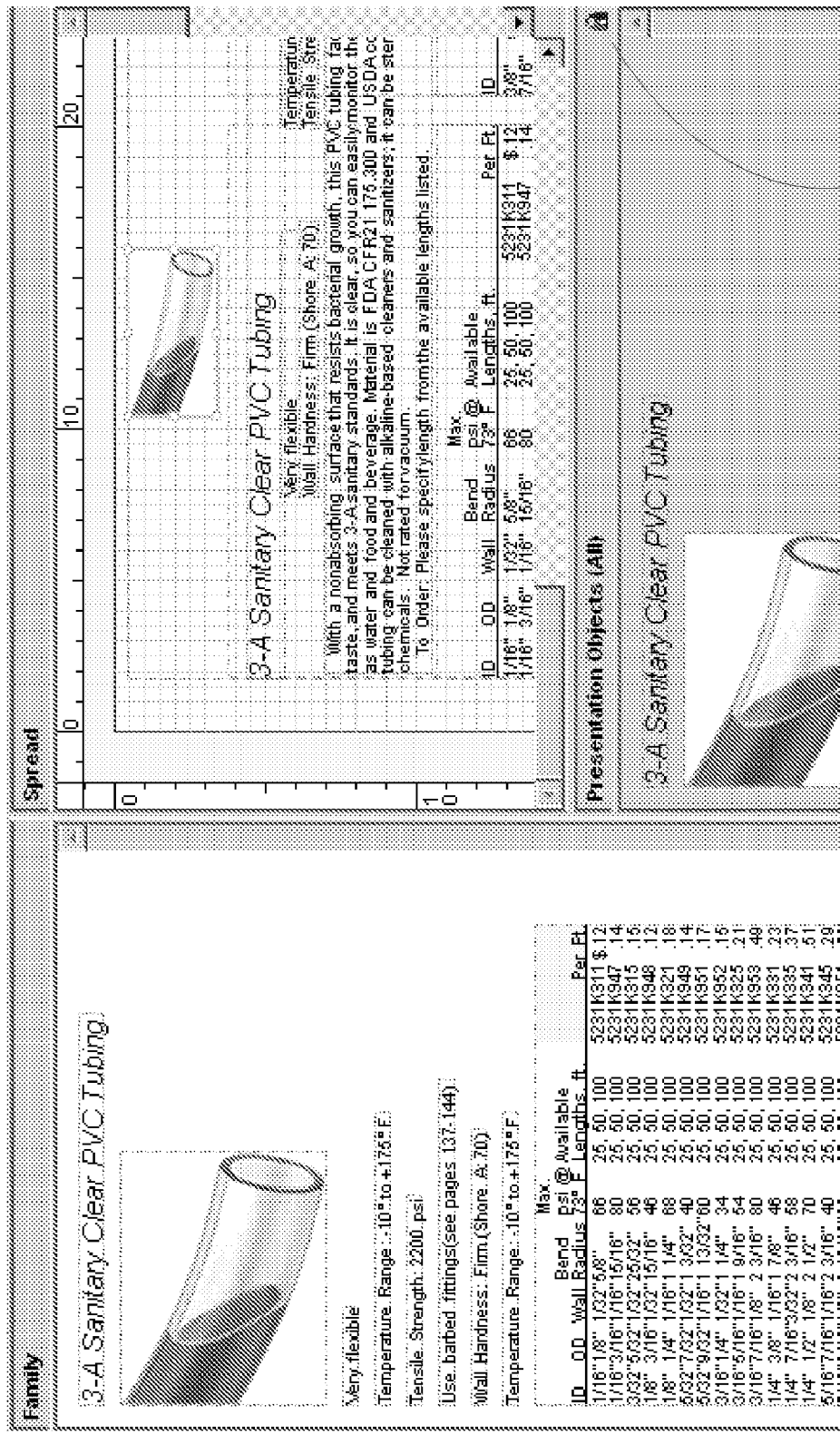
FIG. 21 shows the presentation objects as locked (i.e., protected).

FIG. 21 shows the presentation objects as locked, or protected. Although all presentation objects are shown as locked along with presentation object lock icon 2101, any group of presentation objects may be locked and/or checked out or checked in, as previously described.

While the invention herein disclosed has been described by means of specific embodiments and applications thereof, numerous modifications and variations could be made thereto by those skilled in the art without departing from the scope of the invention set forth in the claims.

What is claimed is:

1. A non-transitory computer program product for multi-user document editing comprising a computer usable memory medium having computer readable program code embodied therein wherein said computer readable program code is configured to:

receive from a user an indication of a granularity level of protection to be associated with at least a portion of presentation data, wherein the indication comprises a selection by the user from a group including family-level granularity, spread-level granularity, presentation layout-level granularity, and presentation object-level granularity;

display a first presentation window of a document on a first computer, wherein said first presentation window is configurable to display any one of a publication tree view, a family view, a spread view, a presentation layout view, and a presentation object view;

display a second presentation window of said document on a second computer, wherein said second presentation window is configurable to display any one of a publication tree view, a family view, a spread view, a presentation layout view, and a presentation object view;

accept a modification request for a requested object within said first presentation window on said first computer, wherein said requested object comprises at least one of a family, a spread, a presentation layout and a presentation object;

if the requested object comprises a family, check if a family-level granularity protection exists on the requested object associated with the modification request;

if the requested object comprises a spread, check if a spread-level granularity protection exists on the requested object associated with the modification request;

if the requested object comprises a presentation layout, check if a presentation layout-level granularity protection exists on the requested object associated with the modification request;

if the requested object comprises a presentation object, check if a presentation object-level granularity protection exists on the requested object associated with the modification request;

grant said protection on said requested object on the appropriate granularity level to said first computer;

prevent modification of said requested object on said appropriate granularity level on said second computer, wherein modification of other objects displayed in said second presentation window is allowed in accordance with the granularity level, and further wherein different users may simultaneously select different granularity levels of protection for the same presentation data;

accept a modification of said requested object on said first computer; and display said modification on said second computer.

2. The computer program product of claim 1 wherein said computer readable program code is further configured to rollback said modification.

3. The computer program product of claim 1 wherein said computer readable program code is further configured to accept said modification wherein said requested object comprises a requested presentation layout and said modification comprises movement of a presentation object within said requested presentation layout.

4. The computer program product of claim 1 wherein said modification comprises deletion.

5. The computer program product of claim 1 wherein said modification comprises addition.

6. The computer program product of claim 1 wherein said modification comprises alteration.

7. The computer program product of claim 1 wherein said document comprises family data, spread data, presentation layout data and presentation object data stored in a database, wherein said computer readable program code is further configured to generate a database lock to grant said protection on said granularity for said requested object.

8. The computer program product of claim 1 wherein said computer readable program code is further configured to check out said requested object.

9. The computer program product of claim 1 wherein said computer readable program code is further configured to check in said requested object.

10. A non-transitory computer program product for multi-user document editing comprising a computer usable memory medium having computer readable program code embodied therein wherein said computer readable program code is configured to:

receive from a user an indication of a user-selected granularity level of protection to be associated with at least a portion of presentation data, wherein the indication comprises a selection by the user from a group including family-level granularity, spread-level granularity, presentation layout-level granularity, and presentation object-level granularity;

display a first presentation window of a document on a first computer, wherein said first presentation window is configurable to display any one of a publication tree view, a family view, a spread view, a presentation layout view, and a presentation object view;

display a second presentation window of said document on a second computer, wherein said second presentation window is configurable to display any one of a publication tree view, a family view, a spread view, a presentation layout view, and a presentation object view;

accept a modification request for a requested object within said first presentation window on said first computer, wherein said requested object comprises at least one of a family, a spread, a presentation layout and a presentation object;

check if a protection exists on said requested object associated with said modification request on the user-selected granularity level associated with said requested object;

grant said protection on said requested object on the user-selected granularity level to said first computer;

prevent modification of said requested object on the user-selected granularity level on said second computer, wherein modification of other objects displayed in said second presentation window is allowed in accordance with the user-selected granularity level, and further wherein different users may simultaneously select different granularity levels of protection for the same presentation data;

accept a modification of said requested object on said first computer; and display said modification on said second computer;

accept a rollback request for said modification;

display said object in an unmodified state within said first presentation window of said document on said first computer; and, display said object in said unmodified state within said second presentation window of said document on said second computer.

11. The computer program product of claim 10 wherein said requested object comprises a requested presentation layout and said computer readable program code is further configured to accept a modification wherein said modification comprises movement of a requested presentation object within a requested presentation layout.

12. The computer program product of claim 10 wherein said modification comprises deletion.

13. The computer program product of claim 10 wherein said modification comprises addition.

14. The computer program product of claim 10 wherein said document comprises family data, spread data, presentation layout data and presentation object data stored in a database, and wherein computer readable program code is further configured to generate a database lock to grant protection on said granularity for said requested object.

15. The computer program product of claim 10 wherein said computer readable program code is further configured to check out or check in said requested object.

16. A non-transitory computer program product for multi-user document editing comprising a computer usable memory medium having computer readable program code embodied therein wherein said computer readable program code is configured to:

receive from a user an indication of a user-selected granularity level of protection to be associated with at least a portion of presentation data, wherein the indication comprises a selection by the user from a group including family-level granularity, spread-level granularity, presentation layout-level granularity, and presentation object-level granularity;

display a first presentation window of a document on a first computer, wherein said first presentation window is configurable to display any one of a publication tree view, a family view, a spread view, a presentation layout view, and a presentation object view;

display a second presentation window of said document on a second computer, wherein said second presentation window is configurable to display any one of a publication tree view, a family view, a spread view, a presentation layout view, and a presentation object view;

accept a modification request for a requested object within said first presentation window on said first computer, wherein said requested object comprises at least one of a family, a spread, a presentation layout and a presentation object;

check if a protection exists on said requested object associated with said modification request on the user-selected granularity level associated with said requested object;

grant said protection on said requested object on the user-selected granularity level to said first computer;

prevent modification of said requested object on the user-selected granularity level on said second computer, wherein modification of other objects displayed in said second presentation window is allowed in accordance with the user-selected granularity level;

accept a modification of said requested object on said first computer; and display said modification on said second computer;

wherein said document comprises family data, spread data, presentation layout data and presentation object data stored in a database, and wherein computer readable program code is further configured to generate a database lock to grant said protection on said granularity for said requested object, and further wherein different users may simultaneously select different granularity levels of protection for the same presentation data.

* * * * *